US 012411543B2

(12) United States Patent
Pomeroy (10) Patent No.: US 12,411,543 B2
(45) Date of Patent: Sep. 9, 2025

(54) ORIENTATION FEEDBACK DEVICES AND METHODS

(71) Applicant: Apple Inc., Cupertino, CA (US)

(72) Inventor: Shannon Pomeroy, San Francisco, CA (US)

(*) Notice: Subject to any disclaimer, the term of this patent is extended or adjusted under 35 U.S.C. 154(b) by 0 days.

(21) Appl. No.: 18/391,641

(22) Filed: Dec. 20, 2023

(65) Prior Publication Data

US 2024/0272707 A1 Aug. 15, 2024

Related U.S. Application Data

(60) Provisional application No. 63/485,208, filed on Feb. 15, 2023.

(51) Int. Cl.
*G06F 3/01* (2006.01)
*G06F 1/16* (2006.01)
*G06F 3/16* (2006.01)

(52) U.S. Cl.
CPC .............. *G06F 3/012* (2013.01); *G06F 1/163* (2013.01); *G06F 3/016* (2013.01); *G06F 3/16* (2013.01)

(58) Field of Classification Search
CPC .......... G06F 3/012; G06F 1/163; G06F 3/016; G06F 3/16
See application file for complete search history.

(56) References Cited

U.S. PATENT DOCUMENTS

| | | | | |
|---|---|---|---|---|
| 5,942,954 | A * | 8/1999 | Galiana | A61B 5/4863 351/209 |
| 9,505,633 | B2 * | 11/2016 | Bari | B01D 35/143 |
| 9,795,177 | B1 * | 10/2017 | Weaver | A42B 3/044 |
| 10,529,248 | B2 * | 1/2020 | Chavez | G09B 9/302 |
| 11,385,716 | B1 * | 7/2022 | Mukherjee | G08B 6/00 |
| 2007/0236450 | A1 * | 10/2007 | Colgate | G06F 3/041 345/156 |
| 2011/0282130 | A1 * | 11/2011 | Krueger | G01C 23/00 600/27 |
| 2012/0081658 | A1 * | 4/2012 | Sugihara | G02B 27/0176 351/158 |
| 2013/0222270 | A1 * | 8/2013 | Winkler | H04M 1/72448 345/1.3 |
| 2014/0306891 | A1 * | 10/2014 | Latta | G02B 27/017 345/158 |
| 2015/0054630 | A1 * | 2/2015 | Xu | G06F 3/04883 340/12.5 |
| 2015/0068052 | A1 * | 3/2015 | Krueger | G01C 9/16 33/301 |
| 2015/0273179 | A1 * | 10/2015 | Krueger | G02C 11/00 600/27 |
| 2016/0166930 | A1 * | 6/2016 | Brav | G08B 21/02 463/30 |
| 2016/0217621 | A1 * | 7/2016 | Raghoebardajal | H04N 13/366 |
| 2016/0300099 | A1 * | 10/2016 | Xiaolu | G06V 40/165 |
| 2017/0011553 | A1 * | 1/2017 | Chen | G02B 27/0172 |
| 2017/0083104 | A1 * | 3/2017 | Namba | G06F 3/0219 |

(Continued)

*Primary Examiner* — Amy Onyekaba
(74) *Attorney, Agent, or Firm* — Dorsey & Whitney LLP (57) ABSTRACT

An orientation feedback device for a head-mountable display (HMD) is disclosed. In an example, an HMD includes a display, a frame at least partially surrounding the display, a facial interface attached to the frame, and an orientation feedback device attached to one or more of the frame or the facial interface. The orientation feedback device can include an orientation indicator.

18 Claims, 6 Drawing Sheets

(56) References Cited

U.S. PATENT DOCUMENTS

| | | | |
|---|---|---|---|
| 2017/0243324 A1* | 8/2017 | Mierle | G06T 15/005 |
| 2018/0008141 A1* | 1/2018 | Krueger | A61B 5/7257 |
| 2018/0095534 A1* | 4/2018 | Omote | G02B 27/017 |
| 2018/0165942 A1* | 6/2018 | Hoshino | G06F 3/04815 |
| 2018/0261010 A1* | 9/2018 | Kudirka | A63B 24/0021 |
| 2019/0384396 A1* | 12/2019 | Cruz Hernandez | B06B 1/0246 |
| 2019/0387299 A1* | 12/2019 | Evans | H04R 5/02 |
| 2020/0038752 A1* | 2/2020 | Bickerstaff | A63F 13/211 |
| 2020/0057476 A1* | 2/2020 | Robinson | A45F 3/04 |
| 2020/0089333 A1* | 3/2020 | Benson | A63F 13/212 |
| 2020/0096775 A1* | 3/2020 | Franklin | G06F 3/011 |
| 2020/0098335 A1* | 3/2020 | Chen | G09G 5/10 |
| 2020/0134895 A1* | 4/2020 | Pollard | G06F 3/011 |
| 2020/0175761 A1* | 6/2020 | Jones | G06F 3/016 |
| 2020/0233220 A1* | 7/2020 | Strongwater | G06F 3/012 |
| 2020/0233453 A1* | 7/2020 | Hatfield | G06F 1/163 |
| 2020/0400948 A1* | 12/2020 | Maric | G02B 27/017 |
| 2021/0064143 A1* | 3/2021 | Stern | G06F 3/017 |
| 2021/0183135 A1* | 6/2021 | Lin | G06T 15/04 |
| 2022/0221946 A1* | 7/2022 | Hsueh | G06F 3/017 |
| 2022/0233942 A1* | 7/2022 | Ferrabee | G06T 7/75 |
| 2022/0294992 A1* | 9/2022 | Manzari | H04N 23/632 |
| 2023/0061649 A1* | 3/2023 | Armstrong | A63F 13/26 |
| 2023/0310939 A1* | 10/2023 | Orfield | G16H 20/30 |
| | | | 482/9 |
| 2024/0036638 A1* | 2/2024 | Min | G06F 3/012 |
| 2024/0184357 A1* | 6/2024 | Sharma | G06V 40/176 |

\* cited by examiner

ORIENTATION FEEDBACK DEVICES AND METHODS

CROSS-REFERENCE TO RELATED APPLICATION(S)

This claims priority to U.S. Patent Application No. 63/485,208, filed 15 Feb. 2023, and entitled "Orientation Feedback Devices and Methods," the entire disclosure of which is hereby incorporated by reference in its entirety.

FIELD

The described examples relate generally to devices and methods for providing orientation feedback to a user. More particularly, the present examples relate to various devices that can be incorporated into a head-mountable device or the like to provide a user of the head-mountable device with orientation feedback to help orient the user, increasing comfort, and decreasing negative effects such as motion sickness, vertigo, and the like.

BACKGROUND

Recent advances in portable computing have enabled head-mountable devices that provide augmented and virtual reality (AR/VR) experiences to users. Head-mountable devices typically include various components such as a display, a viewing frame, a lens, a battery, a motor, a speaker, and other components. These components can operate together to provide an immersive user experience. In particular, head mountable-devices include components that help provide a distraction-free setting by blocking or sealing out the outer environment (e.g., ambient light).

Use of head-mountable devices can result in a disconnect between what a user's brain thinks their body is experiencing, and what their body is experiencing in the real-world. For example, the user's brain may perceive their body as moving, while their body is sitting or standing still in the real-world. This disconnect can result in the user experiencing negative effects, such as motion sickness, vertigo, eye strain, dizziness, headaches, and the like. As a result, the ability to reduce the disconnect between what the user's brain thinks their body is experiencing and what their body is experiencing in the real-world is desired.

SUMMARY

According to some aspects of the present disclosure, a head-mountable device (HMD) includes a display; a frame at least partially surrounding the display; a facial interface attached to the frame; and an orientation feedback device attached to one or more of the frame or the facial interface. The orientation feedback device can include an orientation indicator.

In some examples, the orientation indicator can include a ball in a channel. In some examples, the ball can be configured to move in the channel in a direction parallel to a longitudinal axis of the channel. In some examples, the ball can be configured to move in the channel in a first direction parallel to a longitudinal axis of the channel and in a second direction perpendicular to the longitudinal axis of the channel.

In some examples, the orientation indicator can include a fluid in a chamber. In some examples, the orientation indicator can include a first fluid and a second fluid in a chamber. In some examples, the second fluid can be different from the first fluid.

In some examples, the orientation indicator can include a string attached to a body portion of the orientation feedback device; and a hanging mass attached to the string. In some examples, the orientation feedback device can be removably attached to one or more of the frame or the facial interface.

In some examples, the orientation feedback device can include a marking configured to indicate a roll and a pitch of the HMD. In some examples, the orientation feedback device can include a cover configured to hide the marking from view.

According to some examples, a wearable electronic device includes a display; a facial interface coupled to the display; and a sensor. The sensor can be configured to detect an orientation and movement of the wearable electronic device. The wearable electronic device can be configured to provide vestibular feedback to a user of the wearable electronic device based on a signal from the sensor.

In some examples, the display can be configured to overlay an image of a single-axis level over a display image. In some examples, an indicator of the single-axis level can be configured to move in response to the orientation and the movement detected by the sensor.

In some examples, the display can be configured to overlay an image of a multi-axis level over a display image. In some examples, an indicator of the multi-axis level can be configured to move in response to the orientation and the movement detected by the sensor.

In some examples, the display can be configured to alter a shadow presented in a display image in response to the orientation and the movement detected by the sensor.

In some examples, the wearable electronic device can further include a vibration actuator configured to vibrate in response to a signal from the sensor. In some examples, the wearable electronic device can further include a speaker that can be configured to provide audio feedback based on signals from the sensor.

According to some aspects, an apparatus includes a lens; a frame coupled to the lens; and an orientation feedback device coupled to the frame. The orientation feedback device can be configured to be disposed between the lens and eyes of a user of the apparatus. The orientation feedback device can include a gravity indicator.

In some examples, the apparatus can include a head-mountable device. In some examples, the apparatus can include smart glasses. In some examples, the apparatus can include goggles.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Detailed reference to representative examples illustrated in the accompanying drawings is provided below. The following descriptions are not intended to limit the examples to one preferred example. Rather, the descriptions are meant to cover alternatives, modifications, and equivalents as can be included within the spirit and scope of the described examples and the appended claims.

The following disclosure relates to wearable electronic devices (e.g., head-mountable devices (HMDs)), including those that include orientation feedback devices and methods of providing orientation feedback to users thereof. Use of head-mountable devices can result in a disconnect between what a user's brain thinks their body is experiencing (e.g., in a virtual world), and what their body is experiencing in the real-world. For example, the user's brain may perceive their body as moving, while their body is sitting or standing still in the real-world. This disconnect can result in the user experiencing negative effects, such as motion sickness, vertigo, eye strain, dizziness, headaches, and the like. It can be desirable to provide head-mountable devices that include various orientation feedback devices that reduce or eliminate the disconnect between what the user's brain thinks their body is experiencing and what their body is actually experiencing.

A head-mountable device of the present disclosure includes an orientation feedback device. In some examples, the orientation feedback device can be a removable device that can be attached to the head-mountable device. In some examples, the orientation feedback device can be built into the head-mountable device. The orientation feedback device can include one or more sensors and/or actuators in the head-mountable device. In some examples, the orientation feedback device can include software, which can overlay or otherwise interact with images displayed to a user to include information relevant to what a user's body is currently experiencing in the real-world. The orientation feedback device can detect gravity using sensors disposed on or in the head-mountable device, can detect the user's orientation using sensors disposed outside the head-mountable device, or the like, in order to provide orientation feedback to the user. The orientation feedback device can provide the user of the head-mountable device with information relevant to what their body is experiencing in the real-world, which reduces the disconnect between what the user's brain perceives their body is experiencing while using the head-mountable device and what their body is experiencing in the real-world. This can reduce negative side effects associated with using the head-mountable device, such as motion sickness, vertigo, eye strain, dizziness, headaches, and the like.

Although the devices disclosed herein are described as orientation feedback devices, any devices that aid a user in connecting to reality can be included. These devices can include any reality indication devices that supply information to the user about their real-world surroundings, and can be referred to broadly as reality indicators. Although some examples refer to sensors, actuators, and devices that use gravity for orientation of the user, any characteristics can be used to supply information to the user regarding their surroundings. For example, stationary sensors, cameras, magnetic sensors, radar sensors, light sensors, and any other devices can be used.

These and other examples are discussed below with reference to FIGS. 1A through 8. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1A:
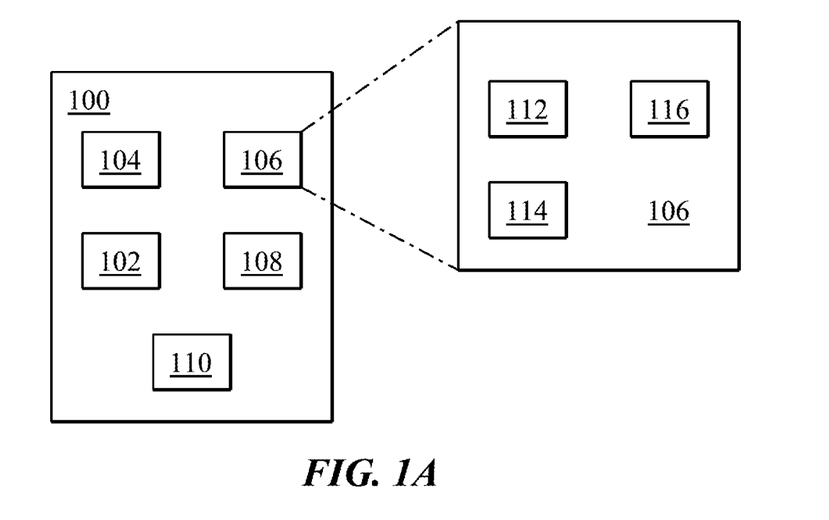
FIG. 1A is a schematic block diagram of an example of a head-mountable device.
Figure 1B:
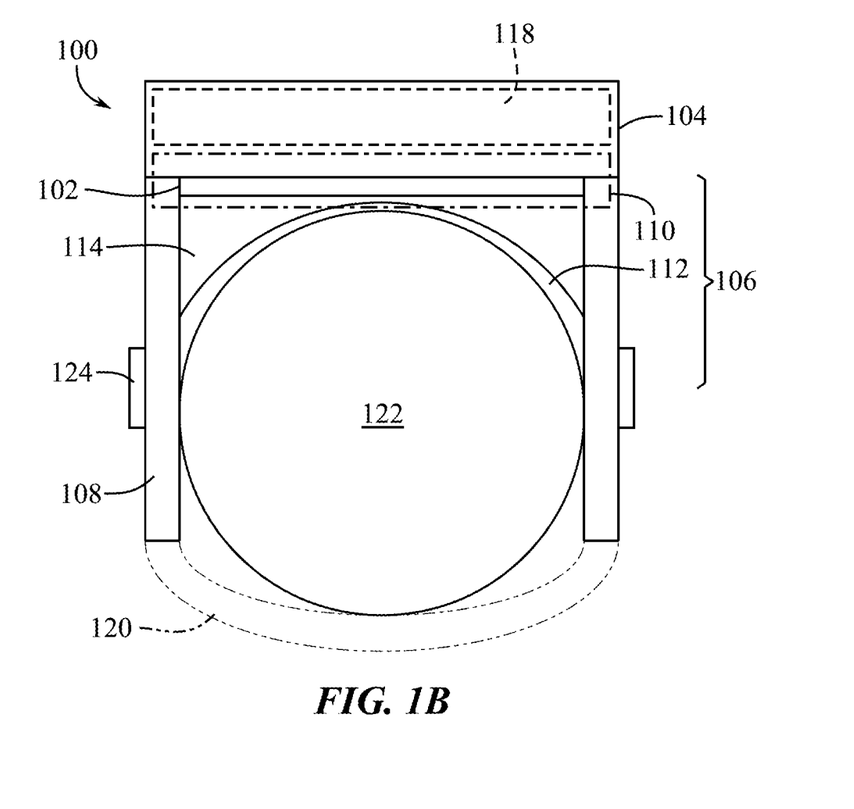
FIG. 1B is a top view of an example of a head-mountable device.
Figure 1C:
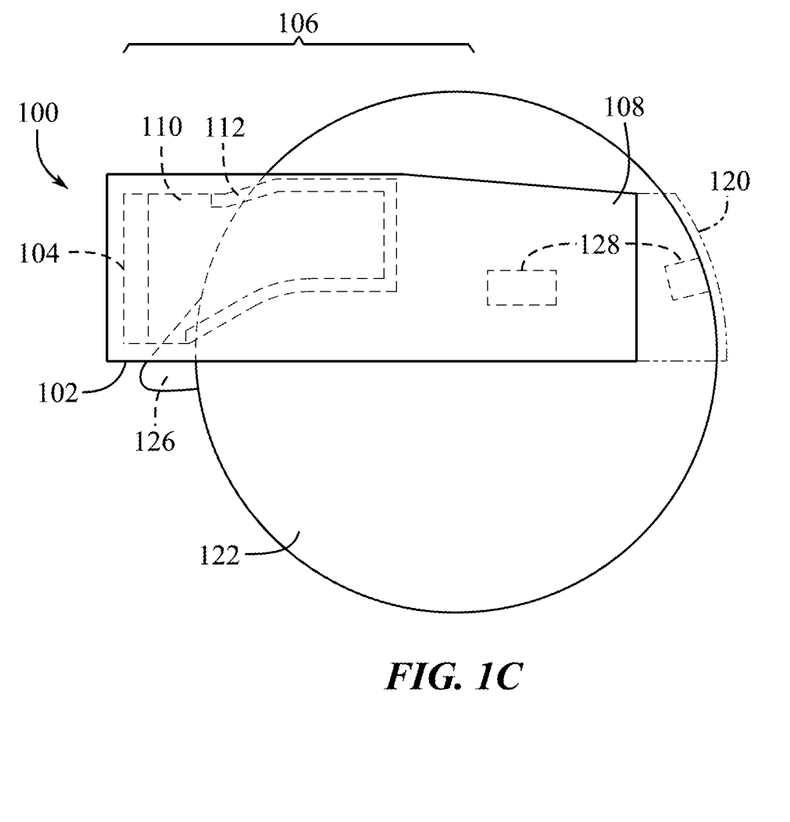
FIG. 1C is a side view of an example of a head-mountable device.

FIG. 1A illustrates a block diagram of a head-mountable device (HMD) 100 including a frame 102, a display 104, a device seal 106, supports 108, and an orientation feedback device 110. FIGS. 1B and 1C illustrate a top-down view and a side view of the HMD 100. The display 104 can include one or more optical lenses or display screens that are configured to be positioned in front of the eyes of a user. The display 104 can be configured to present an augmented reality visualization, a virtual reality visualization, or another suitable visualization to the user. The display 104 can be positioned at least partially in or on the frame 102. The frame 102 can be a housing of the display 104. The device seal 106 can be physically coupled to the frame 102. In some examples, the device seal 106 includes the frame 102 (e.g., the frame 102 can be part of the device seal 106).

The supports 108 can retain the HMD 100 relative to the user's head. The supports 108 can be connected to the display 104 and extend distally toward the rear of the user's head. The supports 108 can be configured to secure the display 104 in a position relative to the user's head (e.g., such that the display 104 is maintained in front of the user's eyes). The supports 108 can extend over the user's ears. In some examples, the supports 108 can rest on the user's ears to secure the HMD 100 via friction between the supports 108 and the user's head. For example, the supports 108 can apply opposing pressures to the sides of the user's head to secure the HMD 100 to the user's head.

The orientation feedback device 110 can be configured to provide orientation feedback to the user of the HMD 100. For example, the orientation feedback device 110 can provide the user with orientation feedback reflecting a current position of the user's body. In some examples, this can include providing vestibular feedback to the user that reflects the current position of the user's body in the real-world. The orientation feedback device 110 can be referred to as a vestibular feedback device. In some examples, orientation feedback provided to the user may include the user's orientation relative to gravity. For example, the orientation feedback device 110 can provide the user with orientation feedback reflecting that the user's body is in a vertical position, a horizontal position, any position between vertical and horizontal, or the like. In some examples, the orientation feedback device 110 can provide the user with orientation feedback reflecting what is happening around the user's body. For example, the orientation feedback device 110 can provide the user with orientation feedback, such as warnings when the user approaches an object (e.g., a wall or the like), when an object approaches the user (e.g., a ball or the like), or the like.

The orientation feedback device 110 can be included in various components of the HMD 100. In some examples, the orientation feedback device 110 can be a physical device. The orientation feedback device 110 can use a fundamental interaction, such as gravity, magnetism, or the like, to provide orientation feedback to the user of the HMD 100. The orientation feedback device 110 can include an indicator that moves within a confinement, such as a channel, a conduit, the end of a string, or the like. For example, the orientation feedback device 110 can include a ball in a channel, a fluid in a chamber (e.g., a spirit level or the like), a hanging mass on a string (e.g., a plumb bob or the like), or the like. The orientation feedback device 110 can indicate the level, plumb, and movement of the user's body, such as the user's head. For example, as the user's body moves, the indicator can move within the confinement. The confinement may include marks that indicate the level or plumb of the user's body, and the indicator can move relative to the marks as the user moves their body.

The orientation feedback device 110 can be removably attached to the HMD 100, such as a clip-on accessory. In some examples, the orientation feedback device 110 can be built into the HMD 100. The orientation feedback device 110 can include a cover that may be used to hide the orientation feedback device 110 from the user's view when desired. For example, the orientation feedback device 110 may include a cover that can slide in front of the orientation feedback device 110 to hide the orientation feedback device 110 from the user's view. The orientation feedback device 110 can be disposed between the display 104 and the user's eyes when the HMD 100 is worn by the user. In examples in which the orientation feedback device 110 is a physical device, the orientation feedback device 110 can provide two-dimensional or three-dimensional orientation feedback.

In some examples, the orientation feedback device 110 can be a digital device. For example, the orientation feedback device 110 can be software that interacts with various components of the HMD 100. The orientation feedback device 110 can interact with sensors, actuators, the display 104, and the like of the HMD 100. The orientation feedback device 110 can interact with sensors of the HMD 100 in order to acquire orientation feedback data relevant to the user's body position and what is happening around the user's body in the real-world. The orientation feedback device 110 can interact with actuators and the display 104 of the HMD 100 in order to provide orientation feedback (e.g., vestibular feedback) to the user.

As an example, the orientation feedback device 110 can interact with an inertial measurement unit (IMU) of the HMD 100 in order to determine a current orientation and movement of the user's body. The orientation feedback device 110 can interact with the display 104 to alter the appearance of shadows presented to the user as the user tilts their head. The orientation feedback device 110 can display a spirit level, a bull's eye level, or another representation of a level or plumb of the user's body over an image displayed on the display 104. The orientation feedback device 110 can interact with actuators of the HMD 100 to provide vibration or the like to the user based on the user tilting their head, objects becoming too close to the user's body, or the like.

The orientation feedback device 110 can interact with cameras of the HMD 100 and the display 104 to overlay images of the user's surroundings over the display 104 when the user is too close to surrounding objects (e.g., walls or the like). As an example, when a user comes within a certain range of an object, the cameras and the display 104 of the HMD 100 can work together to display the object on the display 104. The orientation feedback device 110 can interact with the display 104 to change the color of edges of the display 104 if the user moves their body too close to surrounding objects, as the user tilts or moves their head, or the like. The orientation feedback device 110 can interact with speakers of the HMD 100 to give the user audio signals that relay warnings or information about the position of the user's body or the user's real-world surroundings.

Thus, the orientation feedback device 110 can be included in the HMD 100 to provide the user of the HMD 100 orientation feedback. Any information relevant to the user's surrounding in the real-world can be provided, and this information can include vestibular feedback. This reduces the disconnect between what the user's brain thinks their body is experiencing and what the user's body is experiencing in the real-world. The orientation feedback can be in the form of visual signals, audio signals, physical signals, the like, or any combinations thereof. Providing the user with orientation feedback can reduce side effects associated with use of the HMD, such as motion sickness, vertigo, eye strain, dizziness, headaches, and the like, and can improve user enjoyment and comfort.

The device seal 106 includes a facial interface frame 112, a cover 114, and electrical components (e.g., sensors 116). In some examples, the device seal 106 can include the orientation feedback device 110. The device seal 106 can also be referred to as a light seal. In some examples, the device seal 106 can refer to a portion of the HMD 100 that engages or shields the user's face. The device seal 106 can include portions of the HMD 100 that conform to, contact, or press against regions of the user's face (e.g., the facial interface frame 112).

FIG. 1B illustrates a top-down view of an HMD 100. The HMD 100 of FIG. 1B can be substantially similar to, including some or all of the features of the HMD 100 described with respect to FIG. 1A. The HMD 100 includes a display (also referred to as a display unit) 104 and a retention band 120. In some examples, the display 104 includes an opaque, translucent, transparent, or semi-transparent screen, including any number lenses, for presenting visual data to a user. The display 104 can include any number of internal electronic components 118. The HMD 100 can be mounted on a user's head 122 using the supports 108, the retention band 120, or a combination thereof.

The HMD 100 further includes a frame 102 (also referred to as a housing), a facial interface frame 112, and a cover 114. The frame 102 can be physically coupled to the display 104. The frame 102 can at least partially border one or more edges of the display 104. One end of the cover 114 can be attached to the frame 102 and an opposite end of the cover 114 can be attached to the facial interface frame 112. The facial interface frame 112 can provide an interface between the user's head 122 and the frame 102. The combination of the frame 102, the facial interface frame 112, and the cover 114 can form a device seal 106. It will be understood, however, that the device seal 106 can include fewer or additional components from those listed or shown. In some examples, the orientation feedback device 110 can be part of the device seal 106.

The HMD 100 can be worn on the user's head 122 such that the display 104 is positioned on the user's face and disposed in front of one or both of the user's eyes. The display 104 can be physically coupled to the supports 108, the retention band 120, and/or the device seal 106. In some examples, the retention band 120 can be positioned against sides of the user's head 122 and in contact therewith, against a back surface of the user's head 122 and in contact therewith, or the like. In some examples, the retention band 120 and/or the supports 108 can be at least partially positioned above the user's ears 124. In some examples, the retention band 120 and/or the supports 108 can be positioned adjacent to the user's ears 124. The supports 108 and the retention band 120 can extend around the user's head 122. In this way, the display 104, the device seal 106, the supports 108, and the retention band 120 can form a loop configured to retain the HMD 100 on the user's head 122. It should be understood, however, that this configuration is just one example of how the components of the HMD 100 can be arranged. In some examples, a different number of connector straps and/or retention bands can be included. Although the HMD 100 is referred to as an HMD, it should be understood that the terms wearable device, wearable electronic device, HMD device, and/or HMD system can be used to refer to any wearable device, including smart glasses.

In some examples, the frame 102 is physically coupled to the facial interface frame 112. The facial interface frame 112 can contact the user's head 122, such as the user's face. In some examples, the cover 114 can be a light blocking component that extends between the frame 102 and the facial interface frame 112, such as along portions of the facial interface frame 112. The cover 114 can cover or surround a perimeter of the frame 102 and/or the facial interface frame 112.

The cover 114 can be formed from a cloth, fabric, woven material, plastic, rubber, or any other suitable opaque or semi-opaque material. In some examples, the cover 114 is flexible, having the ability to repeatedly stretch, compress, and deform. The cover 114 can be elastically or in-elastically deformable. The facial interface frame 112 and the cover 114 can be configured to block outside light and limit the peripheral view of the user. In some examples, the cover 114 and the facial interface frame 112 are part of the same or a unitary component.

The orientation feedback device 110 can be disposed between the user's head 122 and the display 104. In some examples, the orientation feedback device 110 can be part of the device seal 106. In some examples, the orientation feedback device 110 can be removably attached to the HMD 100. For example, the orientation feedback device 110 can be attached to the device seal 106 between the device seal 106 and the user's head 122, or the orientation feedback device 110 can be attached to the device seal 106 and the display 104 between the device seal 106 and the display 104. In some examples, the orientation feedback device 110 can include software that interacts with the display 104 to alter the display 104 based on how the user's body is positioned, moves, and the like in the real-world. The orientation feedback device 110 can interact with other components of the HMD 100, such as sensors, actuators, and the like.

FIG. 1C illustrates a side view of an HMD 100 on a user's head 122. The HMD 100 includes a frame 102, a display 104, a device seal 106, supports 108, and a retention band 120. The supports 108 and/or the retention band 120 can retain the HMD 100 on the user's head 122 such that the display 104 sits in front of the user's eyes. The HMD 100 can rest on the bridge of the user's nose 126. As discussed above, the orientation feedback device 110 can be disposed between the user's eyes and the display 104, such that the orientation feedback device 110 is visible to the user during use of the HMD 100.

The HMD 100 can include various electronic devices 128, which may include sensors, actuators, and the like. The electronic devices 128 can be part of the orientation feedback device 110. The electronic devices 128 can be disposed in different positions in the HMD 100, such as in a retention band 120 of the HMD 100 adjacent to a back surface of the user's head 122, in the retention band 120 or supports 108 adjacent to side surfaces of the user's head 122, in the device seal 106 adjacent the user's face, combinations thereof, or the like. In some examples, the electronic devices 128 can include IMU's, mechanical actuators (e.g., vibrational feedback devices), or the like. The sensors included in the electronic devices 128 can be configured to collect orientation feedback data related to a position of the user in the real-world, movement of the user, the surroundings of the user, and the like. The actuators included in the electronic devices can be configured to provide orientation feedback to the user, such as vibrating when the user comes to close to an object, or the like. In some examples, the orientation feedback can include vestibular feedback.

Figure 6:
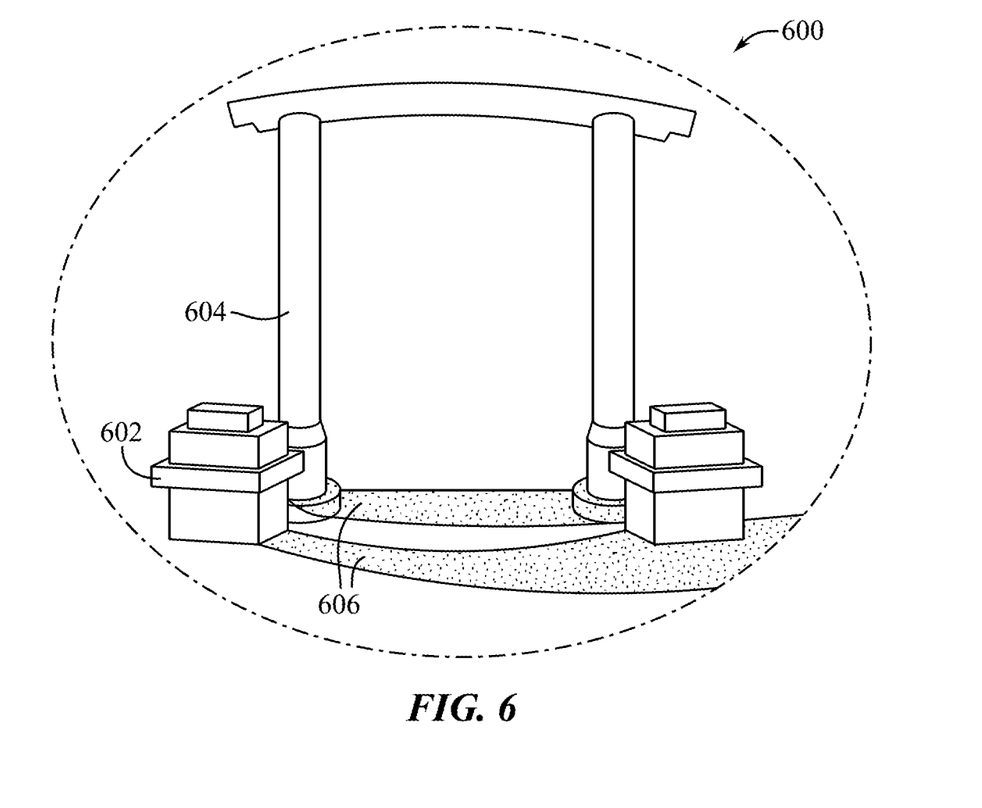
FIG. 6 is a front view of a virtual environment presented to a user by a display of a head-mountable device.
Figure 7:
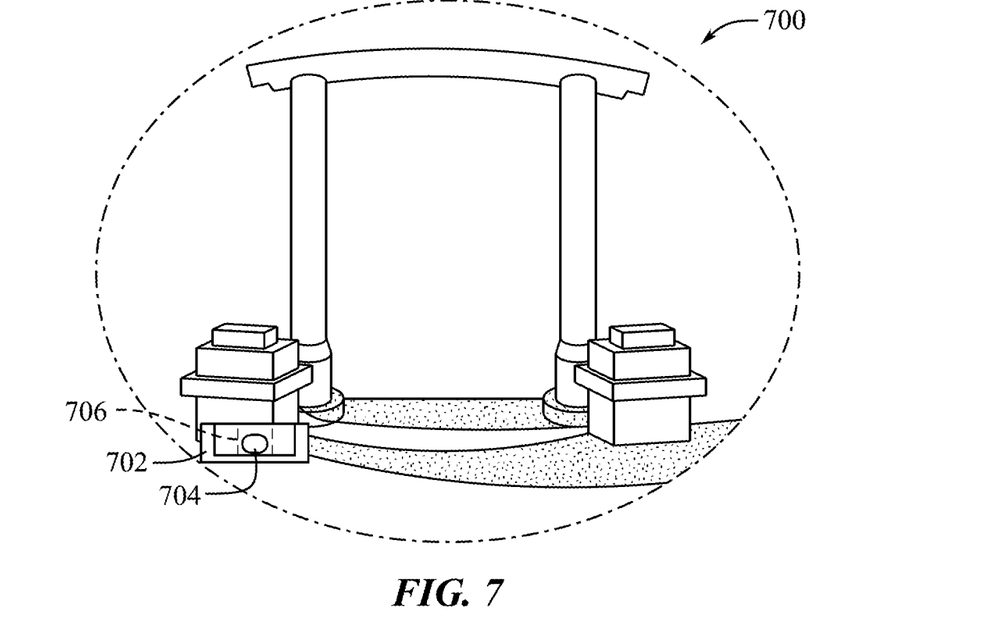
FIG. 7 is a front view of a virtual environment presented to a user by a display of a head-mountable device.
Figure 8:
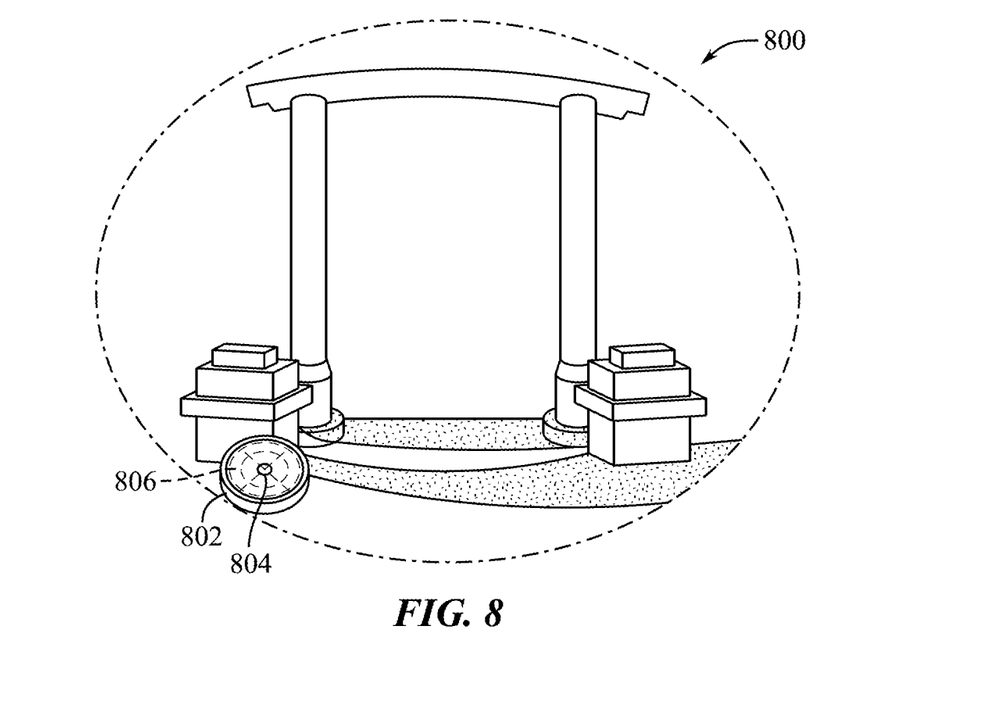
FIG. 8 is a front view of a virtual environment presented to a user by a display of a head-mountable device.

FIGS. 2 through 5 illustrate physical orientation feedback devices in accordance with some examples. The physical orientation feedback devices can be disposed between a user of an HMD's eyes and a display of the HMD, and can be removably attached to the HMD or built into the HMD. FIGS. 6 through 8 illustrate digital orientation feedback devices in accordance with some examples. The digital orientation feedback devices may interface with the display of the HMD, and may also interface with sensors, actuators, and the like of the HMD.

Figure 2:
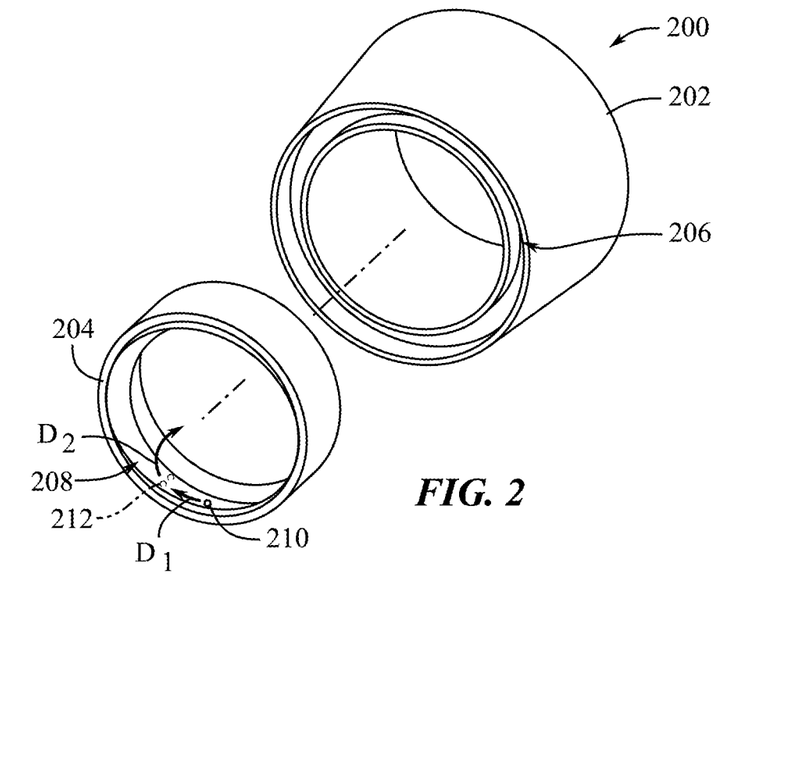
FIG. 2 is a perspective view of an example of a removable orientation feedback device and a portion of a head-mountable device.

FIG. 2 is a partially exploded perspective view of a portion of an HMD 200 and an orientation feedback device 204. The HMD 200 can include a body portion 202 and a channel 206. The orientation feedback device 204 can be removably attached in the channel portion 206 of the body portion 202. The body portion 202 can be a device seal, a frame, or the like of the HMD. The channel portion 206 can be disposed along a proximal surface (e.g., a surface of the device seal or the frame configured to be disposed between the device seal or the frame and a user's face), along a distal surface (e.g., a surface of the device seal or the frame configured to be disposed between the device seal or the frame and a display of the HMD 200), along intermediate surfaces (e.g., surfaces between components of the device seal or the frame between the user's face and the display of the HMD 200), or the like of the device seal, the frame, or the like. In some examples, the body portion 202 can be a portion of the frame surrounding the display of the HMD 200.

In the example of FIG. 2, the orientation feedback device 204 includes a ball 210 that sits in a channel 208. The ball 210 can move in a first direction $D_1$ parallel to a longitudinal axis of the channel 208 and a second direction $D_2$ perpendicular to the longitudinal axis of the channel 208 between an initial position and subsequent positions 212. The movement and position of the ball 210 in the first direction $D_1$ can indicate roll of the HMD 200. The movement and position of the ball 210 in the second direction $D_2$ can indicate pitch of the HMD 200. This provides a user of the HMD 200 with orientation feedback along two axes. In some examples, a narrower channel 208 may be provided, such that the ball 210 only moves in the first direction $D_1$. In some examples, the orientation feedback device 204 can include two channels with one ball in each channel. The second channel can be perpendicular to the first channel, and each channel can indicate movement and/or position along one axis. The ball 210 can be formed of any suitable materials, such as metals (e.g., ball bearings), plastics, polymers, or any other desirable materials. The ball 210 and the channel 208 can be frictionless or have very low friction to allow the ball 210 to move freely about the channel 208. The ball 210 and the channel 208 can be formed of relatively light materials with low coefficients of friction relative to one another, such that the orientation feedback device 204 doesn't change the center of mass of the HMD 200.

The channel 208 can be curved in a direction parallel to the longitudinal axis of the channel 208 and a direction perpendicular to the longitudinal axis of the channel 208 such that the ball 210 settles in a central position in the channel 208. The ball 210 and the channel 208 can detect gravity, with the position of the ball 210 in the channel 208 indicating the direction of gravity. As such, the ball 210 can indicate which way is down to the user of the HMD 200. The channel 208 may include markers that indicate the tilt of the HMD 200 relative to gravity. Although the channel 208 is illustrated as a continuous circular channel, the channel 208 can include stops (e.g., the channel 208 can be U-shaped), or can have any suitable shape.

Movement of the ball 210 in the channel 208 indicates that the HMD 200 is moving or changing positions. The orientation feedback device 204 can be positioned between the user's eyes and the display of the HMD 200, such that the ball 210 is visible in the user's peripheral vision and provides orientation feedback (e.g., vestibular feedback) to the user. In some examples, the ball 210 can be located below the user's line of site when the HMD 200 is worn by the user. This reduces side effects caused by use of the HMD 200, such as motion sickness, vertigo, eye strain, dizziness, headaches, and the like, and improves user comfort.

The orientation feedback device 204 can be removably attached to the channel 206 of the HMD 200 through any suitable means. For example, the orientation feedback device 204 can be attached to the channel 206 using magnets, interlocking features, sliding features, hook-and-loop features (e.g., Velcro), spring snaps, suction features, bistable features, stretch features, re-usable adhesives, mating posts, combinations thereof, or the like. In some examples, the orientation feedback device 204 can be built into the HMD 200, and can include a cover that can slide over the channel 208/ball 210 to hide the ball 210 when desired.

Figure 3:
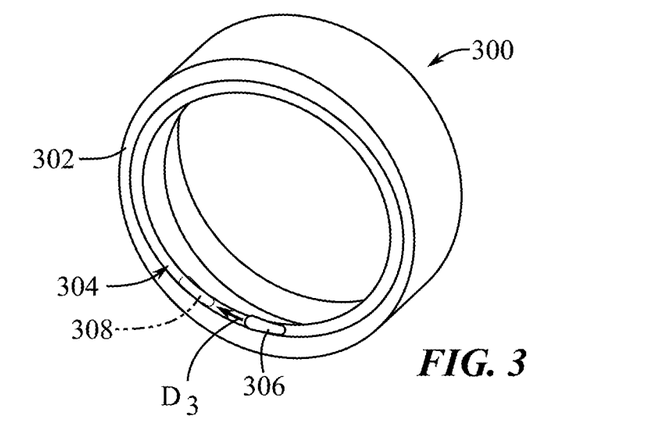
FIG. 3 is a perspective view of an example of a removable orientation feedback device.

FIG. 3 is a perspective view of an orientation feedback device 300. The orientation feedback device 300 can be similar to the orientation feedback device 204, and can be removably attached to an HMD or built into an HMD. In the example of FIG. 3, the orientation feedback device 300 includes a fluid 306 that sits in a chamber 304 formed in a body portion 302. The fluid 306 can move in a direction $D_3$ parallel to a longitudinal axis of the chamber 304. In some examples, the fluid 306 can further move in a direction perpendicular to the longitudinal axis of the chamber 304. The fluid 306 can move between an initial position and a subsequent position 308. The movement and position of the fluid 306 in the direction $D_3$ can indicate roll of the HMD. This provides a user of the HMD with orientation feedback along one axis. In some examples, a wider chamber 304 can be provided, such that the fluid 306 can also move in the direction perpendicular to the longitudinal axis of the chamber 304.

In some examples, the orientation feedback device 300 can include multiple chambers with a fluid in each chamber. The various chambers can each provide orientation feedback to the user with respect to a single axis. The fluid 306 and the chamber 304 can be frictionless or have very low friction to allow the fluid 306 to move freely about the chamber 304. The fluid 306 and the chamber 304 can be formed of relatively light materials with low coefficients of friction relative to one another, such that the orientation feedback device 300 doesn't change the center of mass of the HMD.

The chamber 304 can be curved in a direction parallel to the longitudinal axis of the chamber 304 such that the fluid 306 settles in a central position in the chamber 304. The fluid 306 and the chamber 304 can detect gravity, with the position of the fluid 306 in the chamber 304 indicating the direction of gravity. As such, the fluid 306 can indicate which way is down to the user of the HMD. The chamber 304 may include markers that indicate the tilt of the HMD relative to gravity. Although the chamber 304 is illustrated as a continuous circular channel, the chamber 304 can include end caps (e.g., the chamber 304 can be U-shaped), or can have any suitable shape. Movement of the fluid 306 in the chamber 304 indicates that the HMD is moving or changing positions. The orientation feedback device 300 can be positioned between the user's eyes and the display of the HMD, such that the fluid 306 is visible in the user's peripheral vision and provides orientation feedback to the user. In some examples, the fluid 306 can be located below the user's line of site when the HMD is worn by the user. This reduces side effects caused by use of the HMD, such as such as motion sickness, vertigo, eye strain, dizziness, headaches, and the like, and improves user comfort.

Figure 4:
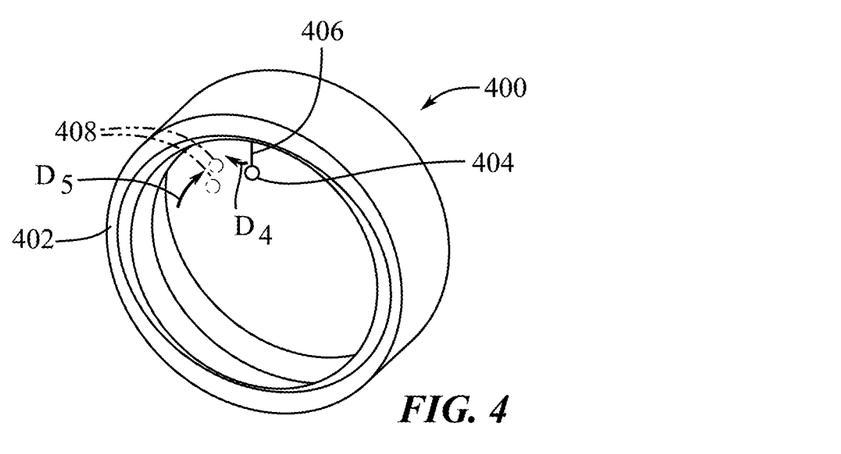
FIG. 4 is a perspective view of an example of a removable orientation feedback device.

FIG. 4 is a perspective view of an orientation feedback device 400. The orientation feedback device 400 can be similar to the orientation feedback device 204 and can be removably attached to an HMD or built into an HMD. In the example of FIG. 4, the orientation feedback device 400 includes a hanging mass 404 attached by a string 406 to a body portion 402 of the orientation feedback device 400. The hanging mass 404 can move in a first direction $D_4$ parallel to a longitudinal axis of the body portion 402 and a second direction $D_5$ perpendicular to the longitudinal axis of the body portion 402. The hanging mass 404 can move between an initial position and subsequent positions 408. The movement and position of the hanging mass 404 in the first direction $D_4$ can indicate roll of the HMD. The movement and position of the hanging mass 404 in the second direction $D_5$ can indicate pitch of the HMD. This provides a user of the HMD with orientation feedback along two axes. The hanging mass 404 can be frictionless or have very low friction to allow the hanging mass 404 to move freely about the inside of the body portion 402. The string 406 can have a length short enough that the hanging mass 404 doesn't interfere with a user's vision, use of the HMD, or strike the user. The hanging mass 404 and the string 406 can be formed of relatively light materials such that the orientation feedback device 400 doesn't change the center of mass of the HMD.

The hanging mass 404 on the string 406 settles in a central position in the body portion 402. The hanging mass 404 and the string 406 can detect gravity, with the position of the hanging mass 404 in the body portion 402 indicating the direction of gravity. As such, the hanging mass 404 can indicate which way is down to the user of the HMD. The body portion 402 may include markers that indicate the tilt of the HMD relative to gravity. Movement of the hanging mass 404 in the body portion 402 indicates that the HMD is moving or changing positions. The orientation feedback device 400 can be positioned between the user's eyes and the display of the HMD, such that the hanging mass 404 is visible in the user's peripheral vision and provides orientation feedback to the user. In some examples, the hanging mass 404 can be located above the user's line of site when the HMD is worn by the user. This reduces side effects caused by use of the HMD, such as such as motion sickness, vertigo, eye strain, dizziness, headaches, and the like, and improves user comfort.

Figure 5:
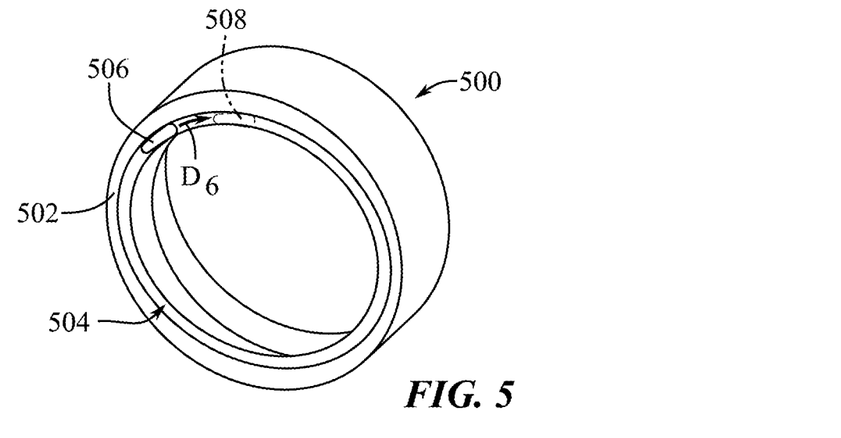
FIG. 5 is a perspective view of an example of a removable orientation feedback device.

FIG. 5 is a perspective view of an orientation feedback device 500. The orientation feedback device 500 can be similar to the orientation feedback device 204 and can be removably attached to an HMD or built into an HMD. In the example of FIG. 5, the orientation feedback device 500 includes a bubble 506 that sits in a chamber 504 formed in a body portion 502. The bubble 506 can move in a direction $D_6$ parallel to a longitudinal axis of the chamber 504. In some examples, the bubble 506 can further move in a direction perpendicular to the longitudinal axis of the chamber 504. The bubble 506 can move between an initial position and a subsequent position 508. The movement and position of the bubble 506 in the direction $D_6$ can indicate roll of the HMD. This provides a user of the HMD with orientation feedback along one axis. In some examples, a wider chamber 504 can be provided, such that the bubble 506 can also move in the direction perpendicular to the longitudinal axis of the chamber 504.

In some examples, the orientation feedback device 500 can include multiple chambers with a bubble in each chamber. The various chambers can each provide orientation feedback to the user with respect to a single axis. The bubble 506 and the chamber 504 can be frictionless or have very low friction to allow the bubble 506 to move freely about the chamber 504. The bubble 506 and the chamber 504 can be formed of relatively light materials with low coefficients of friction relative to one another, such that the orientation feedback device 500 doesn't change the center of mass of the HMD. In some examples, the chamber 504 can be almost completely filled with a first fluid, and the bubble 506 can be a second fluid. For example, the chamber 504 can be mostly filled with a colored fluid, such as ethanol, spirits, or the like, and the bubble 506 can be air.

The chamber 504 can be curved in a direction parallel to the longitudinal axis of the chamber 504 such that the bubble 506 settles in a central position in the chamber 504. The bubble 506 and the chamber 504 can detect gravity, with the position of the bubble 506 in the chamber 504 indicating the direction of gravity (e.g., opposite the bubble 506). As such, the bubble 506 can indicate which way is up to the user of the HMD. The chamber 504 may include markers that indicate the tilt of the HMD relative to gravity. Although the chamber 504 is illustrated as a continuous circular channel, the chamber 504 can include end caps (e.g., the chamber 504 can be U-shaped), or can have any suitable shape. Movement of the bubble 506 in the chamber 504 indicates that the HMD is moving or changing positions. The orientation feedback device 500 can be positioned between the user's eyes and the display of the HMD, such that the bubble 506 is visible in the user's peripheral vision and provides orientation feedback to the user. In some examples, the bubble 506 can be located above the user's line of site when the HMD is worn by the user. This reduces side effects caused by use of the HMD, such as such as motion sickness, vertigo, eye strain, dizziness, headaches, and the like, and improves user comfort.

FIG. 6 is a front view of an environment 600 presented to a user by a display of an HMD. In some examples, the environment can be an augmented reality environment, a virtual reality environment, or the like. Specifically, FIG. 6 illustrates a statue 602, a column 604, and shadows 606. The HMD can use feedback from various sensors of the HMD, such as inertial measurement units (IMUs) to detect movement and position of the HMD and the user's head. In some examples, the HMD can use feedback from sensors outside of the HMD, such as sensors in a room in which the user and the HMD are located, to detect movement, position, and other orientation-related information related to the user. The HMD can then use the feedback to adjust the shadows 606 in response to the movement/position of the user to consistently project shadows on objects as would occur in real life. More specifically, the shadows 606 can be adjusted based on specific head motion of the user in the real-world, rather than the global space of the environment 600 presented to the user. Altering the shadows 606 based on the movement/position of the HMD and the user's head helps to reduce the disconnect between what the user sees through the display of the HMD and what the user's body is experiencing in the real-world. This reduces side effects caused by use of the HMD, such as such as motion sickness, vertigo, eye strain, dizziness, headaches, and the like, and improves user comfort.

FIG. 7 is a front view of an environment 700 presented to a user by a display of an HMD. In FIG. 7, a level 702 is overlaid over the environment 700. The level 702 includes a bubble 704 and indicator lines 706. The HMD can use feedback from various sensors of the HMD, such as inertial measurement units (IMUs) to detect movement and position of the HMD and the user's head. The HMD can then update the position of the bubble 704 in the level 702 to reflect the movement/position of the user and the HMD. The level 702 may be used to track the movement/position of the HMD and the user's head along a single axis, such as a roll axis. The relative positions of the bubble 704 and the indicator lines 706 indicate whether the user's head and the HMD are level. Presenting the level 702 and altering the position of the bubble 704 within the level 702 based on the movement/position of the HMD and the user's head helps to reduce the disconnect between what the user sees through the display of the HMD and what the user's body is actually experiencing. This reduces side effects caused by use of the HMD, such as such as motion sickness, vertigo, eye strain, dizziness, headaches, and the like, and improves user comfort.

FIG. 8 is a front view of an environment 800 presented to a user by a display of an HMD. In FIG. 8, a bull's eye level 802 is overlaid over the environment 800. The bull's eye level 802 includes a bubble 804 and indicator lines 806. The HMD can use feedback from various sensors of the HMD, such as inertial measurement units (IMUs) to detect movement and position of the HMD and the user's head. The HMD can then update the position of the bubble 804 in the bull's eye level 802 to reflect the movement/position of the user and the HMD. The bull's eye level 802 2 may be used to track the movement/position of the HMD and the user's head along two axes, such as a roll axis and a pitch axis. The relative positions of the bubble 804 and the indicator lines 806 indicate whether the user's head and the HMD are level. Presenting the bull's eye level 802 and altering the position of the bubble 804 within the bull's eye level 802 based on the movement/position of the HMD and the user's head helps to reduce the disconnect between what the user sees through the display of the HMD and what the user's body is actually experiencing. This reduces side effects caused by use of the HMD, such as such as motion sickness, vertigo, eye strain, dizziness, headaches, and the like, and improves user comfort.

FIGS. 6 through 8 present visual orientation feedback devices that may be included in HMDs. Other visual orientation feedback devices can be included in HMDs in addition to, or in place of the visual orientation feedback devices discussed in reference to FIGS. 6 through 8. For example, movement and/or position, such as tilt, of an HMD and a user's head can be presented using arrows overlaid on a display. Lights can be displayed on either side of the display based on the direction and speed the HMD and the user's head are moving. For example, brighter lights, different colored lights, lights extending different distances, or the like can be displayed if the HMD is moving faster. Objects from a user's surroundings can be filtered into the display. For example, if a user moves to close to a wall, the wall could be filtered into the display to prevent the user from hitting the wall. Cameras may be included in the HMD in order to capture images of the user's surroundings. In some examples, the cameras can track the ground, and can be used as sensors to provide orientation feedback data to the HMD. In some examples, a single object from the user's real-world surroundings, such as a coffee table, can be filtered into the display to keep the user connected to their surroundings. Filtering in objects from a user's surroundings can aid in both the user's awareness, and safety of the user.

In some examples, audio orientation feedback devices may be included in the HMDs. For example, the HMD can include speakers positioned near each of a user's ears. Beeps on one side of the user's head can inform the user that they are tilting or rotating to one side, with quicker or louder beeps informing the user that they are tilting further or faster to that side. The audio orientation feedback devices can stop beeping when the user's head is positioned upright. In some examples, the audio orientation feedback devices can include a metronome that changes frequency based on movement and/or position of the HMD and the user's head. In some examples, touch orientation feedback devices may be included in the HMDs. For example, the HMD can include actuators in supports, retention bands, or the like positioned on each side of the user's head. The actuators can vibrate and perform similar to the audio orientation feedback devices. For example, when a user tilts or rotates in one direction, the actuators on that side of the user's head can vibrate, and the actuators can vibrate more quickly or aggressively depending on the speed and tilt of the user's movements.

Although the sensors of various examples have been described as IMUs, any types of sensors can be used. For example, the sensors may include a ball in a curved channel and a magnetic detector that detects a position of the ball. The ball can move in the channel based on gravity and movement of the HMD and the user. Thus, the sensors can provide orientation feedback data based on the direction of gravity, movement of the HMD, and the relative position of the HMD. In some examples, the HMD may include outward-facing cameras, which can track the position of the ground, positions of surrounding objects, and the like. Any suitable sensors can be used to obtain orientation feedback data, which can be used by the orientation feedback devices.

Although the orientation feedback devices of the current application have been discussed in the context of HMDs, orientation feedback devices may be helpful in a variety of contexts. For example, orientation feedback devices can be included in goggles or glasses in order to provide a user with information regarding their current position. As an example, a person trapped in an avalanche could use an orientation feedback device to determine which way is up and down in order to help free themselves. Orientation feedback devices could be used in smart glasses in order to track a person's surroundings and warn them in cases of a potential fall or collision. Orientation feedback devices can be used to analyze a user's surroundings and provide warnings if outside objects come too close to the user. Orientation feedback devices can aid in the transition between virtual reality and the real-world, such as fading between a real-world view and a virtual reality view. Orientation feedback devices can aid in car motion sickness. For example, orientation feedback devices can provide users with orientation feedback related to what is happening with a car, even if the user is in a position that they can't see what is happening with the car.

The orientation feedback devices can be paired with devices outside of HMDs. For example, orientation feedback devices can be paired with smart watches, smart phones, tablet devices, laptops, speakers (e.g., wireless ear buds or the like), and the like. The orientation feedback devices can obtain additional orientation feedback data from the outside devices. Further, the orientation feedback devices can provide orientation feedback to a user through the outside devices in addition to or in place of through the HMD.

In some instances, the present systems and methods may utilize user data or information in order to provide a customized or enhanced experience. In instances where user data or information is used, the user data or information should be gathered, used, and/or distributed in accordance with well-known and accepted protocols and procedures.

The details provided above are provided for explanation and incorporate specific language to provide a thorough understanding of the examples described herein. However, the disclosed details are not necessary to practice the examples provided herein, and a number of modifications and variations are possible and are contemplated herein.

What is claimed is:

1. A head-mountable device (HMD), comprising:
   a display;
   a frame at least partially surrounding the display;
   a facial interface attached to the frame; and
   an orientation feedback device removably attached to a channel of one or more of the frame or the facial interface, the orientation feedback device comprising an orientation indicator.

2. The HMD of claim 1, wherein the orientation indicator comprises a ball in a channel.

3. The HMD of claim 2, wherein the ball is configured to move in the channel in a direction parallel to a longitudinal axis of the channel.

4. The HMD of claim 2, wherein the ball is configured to move in the channel in a first direction parallel to a longitudinal axis of the channel, and in a second direction perpendicular to the longitudinal axis of the channel.

5. The HMD of claim 1, wherein the orientation indicator comprises a fluid in a chamber.

6. The HMD of claim 1, wherein:
   the orientation indicator comprises a chamber, a first fluid in the chamber, and a second fluid in the chamber; and
   the second fluid is different from the first fluid.

7. The HMD of claim 1, wherein the orientation indicator comprises:
   a string attached to a body portion of the orientation feedback device; and
   a hanging mass attached to the string.

8. The HMD of claim 1, wherein the orientation feedback device comprises a marking configured to indicate a roll and a pitch of the HMD.

9. The HMD of claim 8, wherein the orientation feedback device comprises a cover configured to hide the marking from view.

10. A wearable electronic device comprising:
a display;
a facial interface coupled to the display; and
a sensor configured to detect an orientation and movement of the wearable electronic device, wherein the wearable electronic device is configured to provide vestibular feedback to a user of the wearable electronic device based on a signal from the sensor;
wherein:
the display is configured to overlay an image of a single-axis level over a display image; and
an indicator of the single-axis level is configured to move in response to the orientation and the movement detected by the sensor.

11. The wearable electronic device of claim 10, wherein:
the display is configured to overlay an image of a multi-axis level over a display image; and
an indicator of the multi-axis level is configured to move in response to the orientation and the movement detected by the sensor.

12. The wearable electronic device of claim 10, wherein the display is configured to alter a shadow presented in a display image in response to the orientation and the movement detected by the sensor.

13. The wearable electronic device of claim 10, further comprising a vibration actuator configured to vibrate in response to a signal from the sensor.

14. The wearable electronic device of claim 10, further comprising a speaker configured to provide audio feedback based on a signal from the sensor.

15. An apparatus comprising:
a lens;
a frame coupled to the lens; and
an orientation feedback device coupled to the frame, wherein:
the orientation feedback device is configured to be disposed between the lens and an eye of a user of the apparatus; and
the orientation feedback device comprises:
a gravity indicator; and
a movable cover configured to hide the gravity indicator from view.

16. The apparatus of claim 15, wherein the apparatus comprises a head-mountable device.

17. The apparatus of claim 15, wherein the apparatus comprises smart glasses.

18. The apparatus of claim 15, wherein the apparatus comprises goggles.

* * * * *